US009099771B2

(12) United States Patent
Merz et al.

(10) Patent No.: US 9,099,771 B2

(45) Date of Patent: Aug. 4, 2015

(54) RESONATING ELEMENT FOR REDUCING RADIO-FREQUENCY INTERFERENCE IN AN ELECTRONIC DEVICE

(75) Inventors: Nicholas G. L. Merz, San Francisco, CA (US); Scott A. Myers, San Francisco, CA (US); Tang Yew Tan, Palo Alto, CA (US); Jaydeep V. Ranade, Cupertino, CA (US); Mattia Pascolini, Campbell, CA (US)

(73) Assignee: Apple Inc., Cupertino, CA (US)

(*) Notice: Subject to any disclaimer, the term of this patent is extended or adjusted under 35 U.S.C. 154(b) by 311 days.

(21) Appl. No.: 13/017,568

(22) Filed: Jan. 31, 2011

(65) Prior Publication Data

US 2012/0178503 A1 Jul. 12, 2012

Related U.S. Application Data

(60) Provisional application No. 61/432,522, filed on Jan. 11, 2011.

(51) Int. Cl.

| | |
|---|---|
| ***H01Q 1/24*** | (2006.01) |
| ***H04M 1/02*** | (2006.01) |
| ***H01Q 1/22*** | (2006.01) |
| ***H01Q 1/48*** | (2006.01) |

(52) U.S. Cl.

CPC ............ *H01Q 1/2266* (2013.01); *H01Q 1/243* (2013.01); *H01Q 1/48* (2013.01)

(58) Field of Classification Search

CPC .................................. H01Q 1/24; H04M 1/02

USPC .......................................... 343/702; 455/566

See application file for complete search history.

(56) References Cited

U.S. PATENT DOCUMENTS

| | | | | |
|---|---|---|---|---|
| 6,559,809 | B1 | 5/2003 | Mohammadian et al. | |
| 6,724,348 | B2 * | 4/2004 | Fang ............................ | 343/702 |
| 6,937,205 | B2 * | 8/2005 | Chou et al. .................... | 343/841 |
| 7,230,571 | B2 | 6/2007 | Gaucher et al. | |
| 7,231,237 | B2 | 6/2007 | Kinezos et al. | |
| 7,595,759 | B2 * | 9/2009 | Schlub et al. ................ | 343/702 |

(Continued)

FOREIGN PATENT DOCUMENTS

| | | |
|---|---|---|
| CN | 101627537 | 1/2010 |
| TW | M286399 U | 1/2006 |

(Continued)

OTHER PUBLICATIONS

Kim, U.S. Appl. No. 12/899,509, filed Oct. 6, 2010.

*Primary Examiner* — Dameon E Levi

*Assistant Examiner* — Andrea Lindgren Baltzell

(74) *Attorney, Agent, or Firm* — Treyz Law Group; G. Victor Treyz; Michael H. Lyons

(57) ABSTRACT

An electronic device may be provided with a display and wireless circuits. The wireless circuits may include antenna structures and radio-frequency transceiver circuitry that transmits and receives radio-frequency signals using the antenna structures. A ground plane for the antenna structures may be located in the center of the electronic device under the display. A resonating element may be used to reduce signal interference that otherwise arises when simultaneously operating the display and the antenna structures. The resonating element may be implemented using an L-shaped structure have an arm that extends parallel to one of the edges of the display.

20 Claims, 5 Drawing Sheets

(56) References Cited

U.S. PATENT DOCUMENTS

| | | | | |
|---|---|---|---|---|
| 7,671,811 | B2 | 3/2010 | Cheng et al. | |
| 7,764,236 | B2 | 7/2010 | Hill et al. | |
| 2001/0026252 | A1 | 10/2001 | Shibata et al. | |
| 2002/0140669 | A1 | 10/2002 | Hsu | |
| 2006/0046787 | A1 | 3/2006 | Zhu et al. | |
| 2007/0085753 | A1* | 4/2007 | Wu et al. | 343/841 |
| 2007/0236397 | A1 | 10/2007 | Cheng et al. | |
| 2008/0079639 | A1* | 4/2008 | Jen-Huan | 343/702 |
| 2008/0106478 | A1* | 5/2008 | Hill | 343/702 |
| 2008/0252536 | A1* | 10/2008 | Anguera et al. | 343/702 |
| 2008/0316121 | A1 | 12/2008 | Hobson et al. | |
| 2009/0122021 | A1 | 5/2009 | Liu et al. | |
| 2009/0174612 | A1 | 7/2009 | Ayala et al. | |
| 2009/0231200 | A1 | 9/2009 | Chiu et al. | |
| 2009/0256758 | A1* | 10/2009 | Schlub et al. | 343/702 |
| 2009/0280757 | A1 | 11/2009 | Zhu et al. | |
| 2010/0105452 | A1 | 4/2010 | Shin et al. | |
| 2010/0123632 | A1* | 5/2010 | Hill et al. | 343/702 |
| 2010/0123640 | A1 | 5/2010 | Hui et al. | |

FOREIGN PATENT DOCUMENTS

| | | |
|---|---|---|
| TW | 200816559 | 4/2008 |
| TW | 200969565 | 9/2009 |
| WO | 2009/085660 | 7/2009 |

* cited by examiner

RESONATING ELEMENT FOR REDUCING RADIO-FREQUENCY INTERFERENCE IN AN ELECTRONIC DEVICE

This application claims the benefit of provisional patent application No. 61/431,522, filed Jan. 11, 2011, which is hereby incorporated by reference herein in its entirety.

BACKGROUND

This relates generally to electronic devices, and, more particularly, to structures for reducing signal interference in electronic devices.

Electronic devices such as cellular telephones and other devices often contain wireless communications circuitry. The wireless communications circuitry may include, for example, cellular telephone transceiver circuits for communicating with cellular telephone networks. Wireless communications circuitry in an electronic device may also include wireless local area network circuits and other wireless circuits. Antenna structures are used in transmitting and receiving wireless signals.

Electronic devices also often contain displays. For example, liquid crystal displays are often provided in cellular telephones. Displays contain arrays of image pixels. For example, liquid crystal displays contain arrays of image pixels based on liquid crystal material. Electrodes in the arrays are used to apply controlled electric fields to the liquid crystal material to change its optical properties and thereby create an image on the display. Display driver circuits are used to generate drive signals for the electrodes in the array.

Challenges arise when mounting displays and wireless circuitry within electronic devices. In many devices, for example, space is at a premium, so there is a desire to locate antennas and displays in close proximity to each other. At the same time, the display driver circuits that are used in driving signals into a display can produce signals that can interfere with the operation of wireless circuits.

It would therefore be desirable to provide ways in which to reduce signal interference between electronic components in an electronic device such as wireless electronic device components.

SUMMARY

An electronic device may be provided with a display such as a liquid crystal display. The display may have display driver circuits that drive signals onto the image pixels of the display.

The electronic device may include wireless circuits such as cellular telephone transceiver circuits and associated antenna structures. The antenna structures and transceiver circuits may be used to transmit and receive radio-frequency signals. A ground plane for the antenna structures may be located in the center of the electronic device under the display.

To reduce signal interference when using multiple components simultaneously in the electronic device, the electronic device may be provided with a resonating element that serves as an interference-reducing structure. The resonating element structure may be implemented using an L-shaped structure having an arm that extends parallel to one of the edges of the display. The resonating element may be used to reduce signal interference that might otherwise arise when simultaneously operating the display and the antenna structures or other circuitry in the electronic device.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in one or more wireless communications bands. Antenna structures in an electronic device may be used in transmitting and receiving radio-frequency signals.

Figure 1:
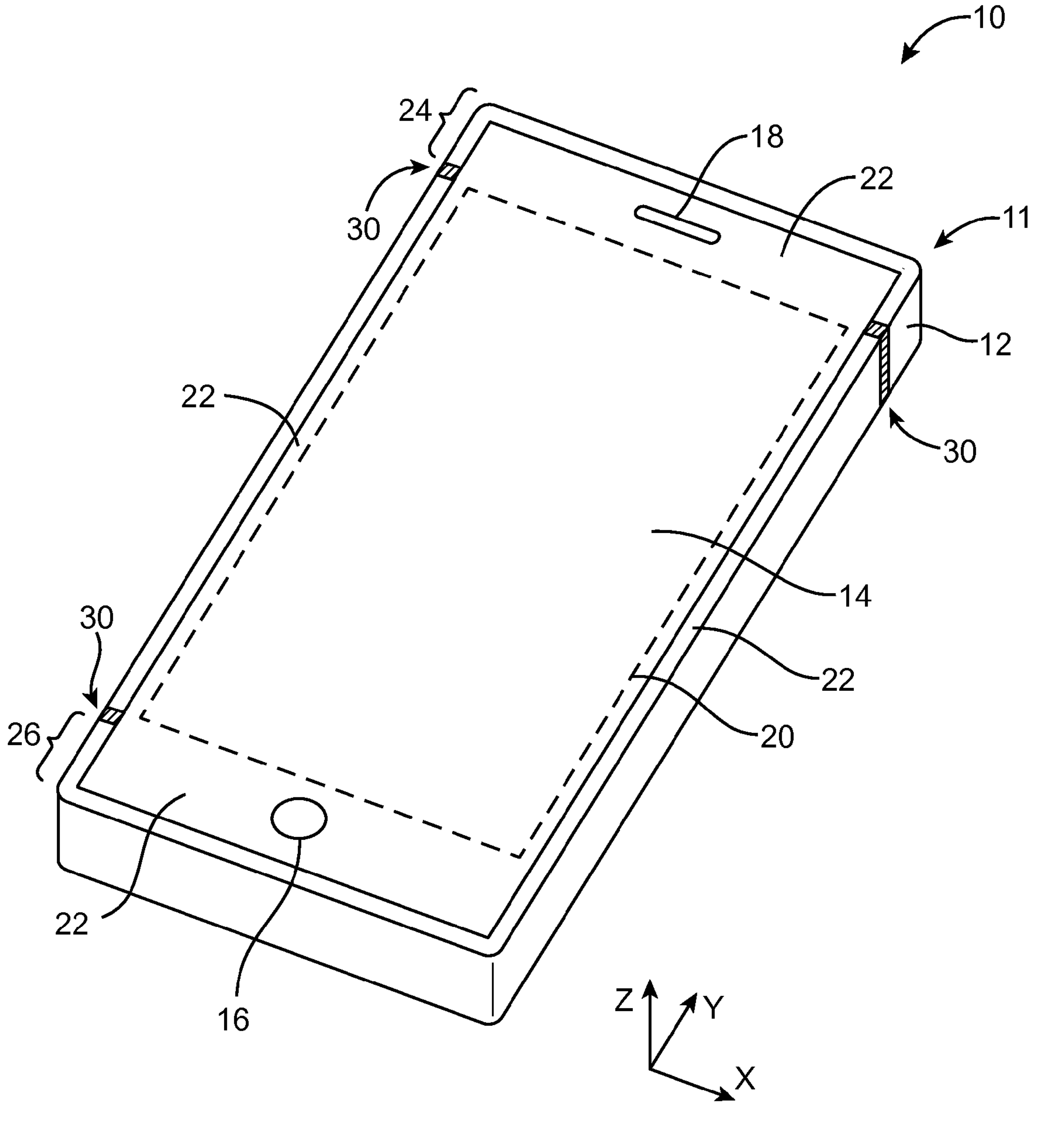
FIG. 1 is a perspective view of an illustrative electronic device of the type that may be provided with a resonating element structure in accordance with an embodiment of the present invention.

An illustrative electronic device that contains wireless communications circuitry is shown in FIG. 1. Device 10 of FIG. 1 may be a notebook computer, a tablet computer, a computer monitor with an integrated computer, a desktop computer, or other electronic equipment. If desired, electronic device 10 may be a portable device such as a cellular telephone, a media player, other handheld devices, a wristwatch device, a pendant device, an earpiece device, or other compact portable device.

As shown in FIG. 1, device 10 may have a housing such as housing 11. Housing 11 may be formed from materials such as plastic, metal, carbon fiber and other fiber composites, ceramic, glass, wood, other materials, or combinations of these materials. Device 10 may be formed using a unibody construction in which some or all of housing 11 is formed from a single piece of material (e.g., a single cast or machined piece of metal, a single piece of molded plastic, etc.) or may be formed from frame structures, housing sidewall structures, and other structures that are assembled together using fasteners, adhesive, and other attachment mechanisms. In the illustrative arrangement shown in FIG. 1, housing 11 includes conductive peripheral housing member 12. Conductive peripheral housing member 12 may have a ring shape that runs around the rectangular periphery of device 10. One or more gaps such as gaps 30 may be formed in conductive peripheral housing member 12. Gaps such as gaps 30 may be filled with dielectric such as plastic and may interrupt the otherwise continuous shape of conductive peripheral housing member. Conductive peripheral housing member may have any suitable number of gaps 30 (e.g., more than one, more than two, three or more, less than three, etc.).

Conductive peripheral housing member 12 may be formed from a durable material such as metal. Stainless steel may be used for forming housing member 12 because stainless steel is aesthetically appealing, strong, and can be machined during manufacturing. Other metals may be used if desired. The rear face of housing 11 may be formed from plastic, glass, metal, ceramic composites, or other suitable materials. For example, the rear face of housing 11 may be formed form a plate of glass having regions that are backed by a layer of internal metal for added strength. Conductive peripheral housing member 12 may be relatively short in vertical dimension Z (e.g., to serve as a bezel for display 14) or may be taller (e.g., to serve as the sidewalls of housing 11 as shown in the illustrative arrangement of FIG. 1).

Device 10 may include components such as buttons, input-output port connectors, ports for removable media, sensors, microphones, speakers, status indicators, and other device components. As shown in FIG. 1, for example, device 10 may include buttons such as menu button 16. Device 10 may also include a speaker port such as speaker port 18 (e.g., to serve as an ear speaker for device 10).

One or more antennas may be formed in device 10. The antennas may, for example, be formed in locations such as locations 24 and 26 to provide separation from the conductive elements of display 14. Antennas may be formed using single band and multiband antenna structures. Examples of communications bands that may be covered by the antennas include cellular telephone bands (e.g., the bands at 850 MHz, 900 MHz, 1800 MHz, 1900 MHz, and 2100 MHz), satellite navigation bands (e.g., the Global Positioning System band at 1575 MHz), wireless local area network bands such as the IEEE 802.11 (WiFi®) bands at 2.4 GHz and 5 GHz, the Bluetooth band at 2.4 GHz, etc. Examples of antenna configurations that may be used for the antennas in device 10 include monopole antennas, dipole antennas, strip antennas, patch antennas, inverted-F antennas, coil antennas, planar inverted-F antennas, open slot antennas, closed slot antennas, loop antennas, hybrid antennas that include antenna structures of multiple types, or other suitable antenna structures.

Device 10 may include one or more displays such as display 14. Display 14 may be a liquid crystal display (LCD), an organic light-emitting diode (OLED) display, a plasma display, an electronic ink display, etc. A touch sensor may be incorporated into display 14 (i.e., display 14 may be a touch screen). The touch sensor may be an acoustic touch sensor, a resistive touch sensor, a piezoelectric touch sensor, a capacitive touch sensor (e.g., a touch sensor based on an array of indium tin oxide capacitor electrodes), or a touch sensor based on other touch technologies.

Display 14 may be covered by a transparent planar conductive member such as a layer of glass or plastic. The cover layer for display 14, which is sometimes referred to as a cover glass layer or cover glass, may extend over substantially all of the front face of device 10, as shown in FIG. 1. The rectangular center portion of the cover glass (surrounded by dashed line 20 in FIG. 1) contains an array of image pixels and is sometimes referred to as the active portion of the display. The peripheral outer portion of the cover glass (i.e., rectangular peripheral ring 22 of FIG. 1) does not contain any active image pixels and is sometimes referred to as the inactive portion of display 14. A patterned opaque masking layer such as a peripheral ring of black ink may be formed under inactive portion 22 to hide interior device components from view by a user.

Figure 2:
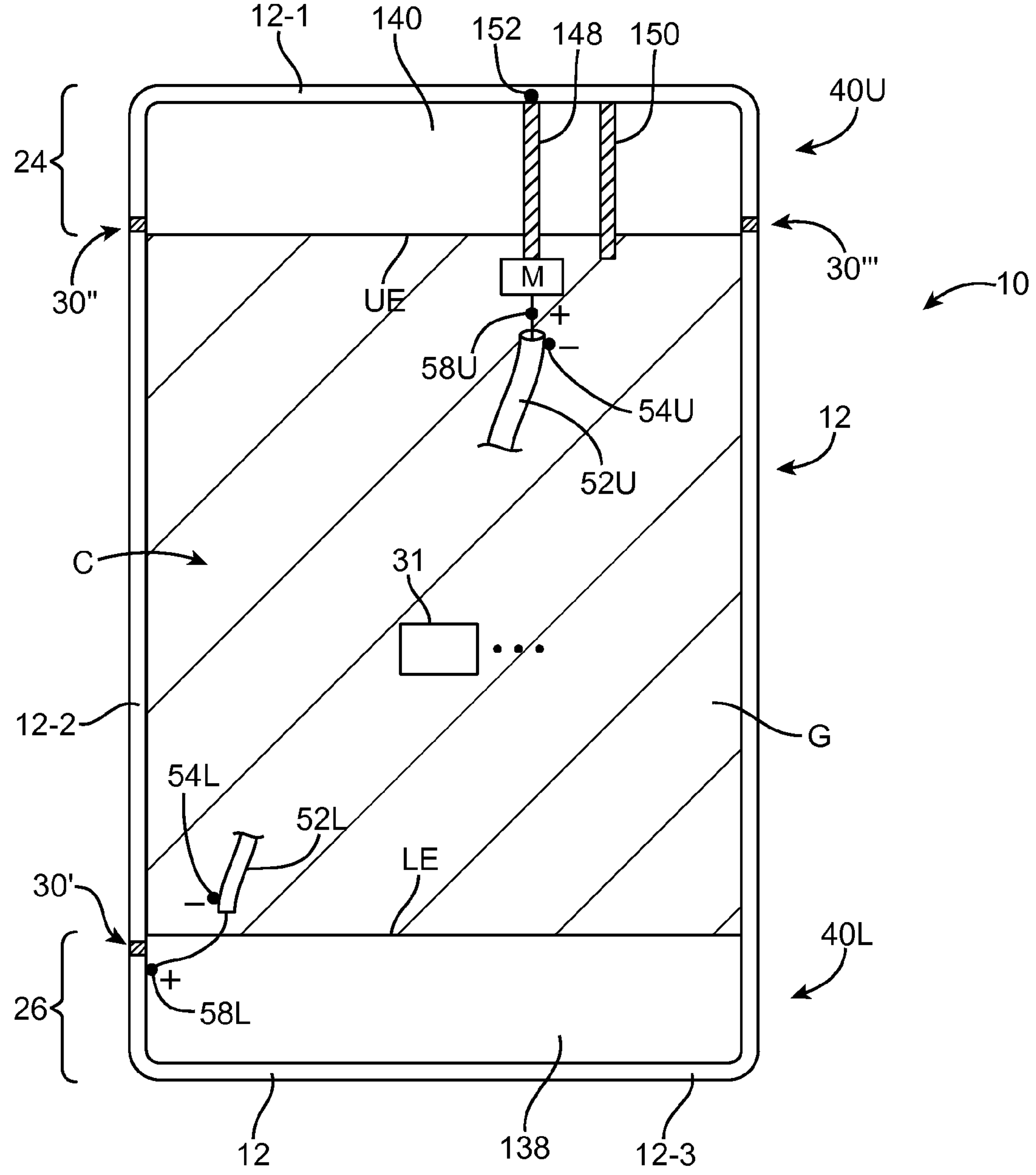
FIG. 2 is a top interior view of an electronic device of the type shown in FIG. 1 in accordance with an embodiment of the present invention.

FIG. 2 is a top view of the interior of device 10 showing how antennas 40L and 40U may be implemented within housing 12. As shown in FIG. 2, ground plane G may be formed within housing 12. Ground plane G may form antenna ground for antennas 40L and 40U. Because ground plane G may serve as antenna ground, ground plane G may sometimes be referred to as antenna ground, ground, or a ground plane element (as examples). One or more printed circuit boards or other mounting structures may be used to mount components 31 in device 10. Components 31 may include radio-frequency transceiver circuits that are coupled to antennas 40U and 40L using transmission lines 52L and 52U, processors, application-specific integrated circuits, cameras, sensors, switches, connectors, buttons, and other electronic device components.

In central portion C of device 10, ground plane G may be formed by conductive structures such as a conductive housing midplate member (sometimes referred to as an internal housing plate or planer internal housing structures). The structures of ground plane G may be connected between the left and right edges of member 12. Printed circuit boards with conductive ground traces (e.g., one or more printed circuit boards used to mount components 31) may form part of ground plane G.

The midplate member may have one or more individual sections (e.g., patterned sheet metal sections) that are welded together. Portions of the midplate structures may be covered with insert-molded plastic (e.g., to provide structural support in portions of the interior of device where no conductive ground is desired, such dielectric-filled portions of antennas 40U and 40L in regions 24 and 26).

At ends 24 and 26 of device 10, the shape of ground plane G may be determined by the shapes and locations of conductive structures that are tied to ground. Ground plane G in the simplified layout of FIG. 2 has a straight upper edge UE and a straight lower edge LE. In actual devices, the upper and lower edges of ground plane G and the interior surface of conductive peripheral housing member 12 generally have more complex shapes determined by the shapes of individual conductive structures that are present in device 10. Examples of conductive structures that may overlap to form ground plane G and that may influence the shape of the inner surface of member 12 include housing structures (e.g., a conductive housing midplate structure, which may have protruding portions), conductive components (e.g., switches, cameras, data connectors, printed circuits such as flex circuits and rigid printed circuit boards, radio-frequency shielding cans, buttons and conductive button mounting structures), and other conductive structures in device 10. In the illustrative layout of FIG. 2, the portions of device 10 that are conductive and tied to ground to form part of ground plane G are shaded and are contiguous with central portion C.

Openings such as openings 138 and 140 (sometimes referred to as gaps) may be formed between ground plane G and respective portions of peripheral conductive housing member 12. Openings 138 and 140 may be filled with air, plastic, and other dielectrics. Openings 138 and 140 may be associated with antenna structures 40U and 40L.

Lower antenna 40L may be formed by a loop antenna structure having a shape that is determined at least partly by the shape of the lower portions of ground plane G and conductive housing member 12. In the example of FIG. 2, opening 138 is depicted as being rectangular, but this is merely illustrative. In practice, the shape of opening 138 may be dictated by the placement of conductive structures in region 26 such as a microphone, flex circuit traces, a data port connector, buttons, a speaker, etc.

Lower antenna 40L may be fed using an antenna feed made up of positive antenna feed terminal 58L and ground antenna feed terminal 54L. Transmission line 52L may be coupled to the antenna feed for lower antenna 40L. Gap 30' may form a capacitance that helps configure the frequency response of antenna 40L. If desired, device 10 may have conductive housing portions, matching circuit elements, and other structures and components that help match the impedance of transmission line 52L to antenna 40L.

Antenna 40U may be a two-branch inverted-F antenna. Transmission line 52U may be used to feed antenna 40U at antenna feed terminals 58U and 54U. Conductive structures 150 may form a shorting path that bridges dielectric opening 140 and electrically shorts ground plane G to peripheral housing member 12. Conductive structure 148 (which may be formed using structures of the type used in forming structures 150 or other suitable structures) and matching circuit M may be used to connect antenna feed terminal 58U to peripheral conductive member 12 at point 152. Conductive structures such as structures 148 and 150 (which are sometimes referred to as conductive paths) may be formed by flex circuit traces, conductive housing structures, springs, screws, welded connections, solder joints, brackets, metal plates, or other conductive structures.

Gaps such as gaps 30', 30", and 30''' (e.g., gaps 30 of FIG. 1) may be present in peripheral conductive member 12. A phantom gap may be provided in the lower right-hand portion of device 10 for aesthetic symmetry if desired. The presence of gaps 30', 30", and 30''' may divide peripheral conductive housing member 12 into segments. As shown in FIG. 2, peripheral conductive member 12 may include first segment 12-1, second segment 12-2, and third segment 12-3.

Segment 12-1 may form antenna resonating element arms for antenna 40U. In particular, a first portion (segment) of segment 12-1 may extend from point 152 (where segment 12-1 is fed) to the end of segment 12-1 that is defined by gap 30" and a second portion (segment) of segment 12-1 may extend from point 152 to the opposing end of segment 12-1 that is defined by gap 30'''. The first and second portions of segment 12-1 may form respective branches of an inverted F antenna and may be associated with respective low band (LB) and high band (HB) antenna resonances for antenna 40U. The relative positions of structures 148 and 150 along the length of member 12-1 may affect the response of antenna 40U and may be selected to tune antenna 40U. Antenna tuning adjustments may also be made by adjusting matching circuit M, by adjusting the configuration of components used in forming paths 148 and 150, by adjusting the shapes of opening 140, etc. Antenna 40L may likewise be adjusted.

With one illustrative arrangement, antenna 40L may cover the transmit and receive sub-bands in five communications bands (e.g., 850 MHz, 900 MHz, 1800 MHz, 1900 MHz, and 2100 MHz). Antenna 40U may, as an example, be configured to cover a subset of these five illustrative communications bands. For example, antenna 40U may be configured to cover a two receive bands of interest and, with tuning, four receive bands of interest.

Figure 3:
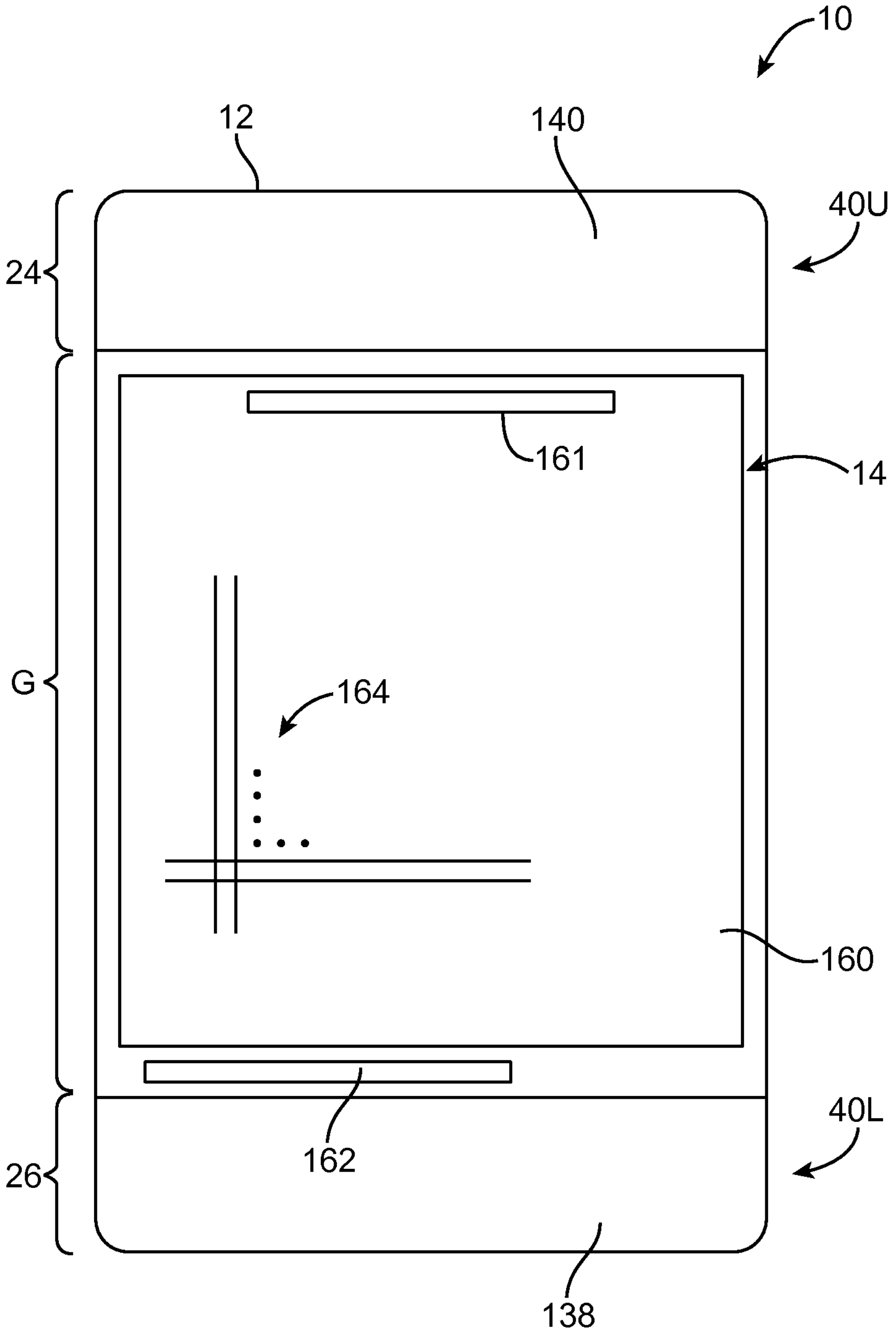
FIG. 3 is a diagram of the electronic device of that includes a resonating element structure in accordance with an embodiment of the present invention.

As shown in FIG. 3, display 14 may include display module 160. When enclosed within device 10 of FIG. 1, display module 160 may be mounted under a cover layer such as a layer of plastic or a glass layer (cover glass). Display module 160 (which is also sometimes referred to as a display) may include display driver circuitry 161. Display driver circuitry 161 may be used to drive signals into the display (e.g., circuitry 164). Display module 160 may be, for example, a liquid crystal display that includes a color filter array, a layer of liquid crystal material, and an array of image pixel electrodes and associated thin-film transistors (e.g., a thin-film transistor layer). The display driver circuitry may include a driver integrated circuit that is mounted to one end of the thin-film-transistor layer. Circuitry 164 may include an array of thin-film transistors and control lines that are used to distribute signals to the display from the display driver circuitry.

Components 31 (FIG. 2) may include radio-frequency transceiver circuitry (e.g., one or more cellular telephone receivers, one or more cellular telephone transmitters, receivers and transmitters associated with other bands, etc.). During radio-frequency transmissions using the radio-frequency transmitter, radio-frequency signals may be emitted by the antennas in device 10. For example, antenna 40L may emit cellular telephone signals, some of which may coupled into the control lines and other circuitry of display 164. During operation of driver circuitry 161, drive signals from driver circuitry 161 may mix with the signals from the cellular telephone transmitter (or other wireless transmitter). This tends to create undesired mixing products (e.g., intermodulation distortion or IMD). The mixing products may have frequencies that fall within one or more of the receive bands of the cellular telephone receivers in device 10 (or other wireless communications bands of interest) and thereby serve as a form of undesired signal interference whenever the display and cellular circuitry in device 10 are in simultaneous use.

To reduce undesired signal interference in device 10 (e.g., to reduce interference between antennas in device 10 and display 14 or to reduce interference between other components in device 10), one or more resonating element structures may be provided in device 10 such as resonating element structure 162. A resonating element structure such as structure 162 has an antenna-like quality in that it resonates most strongly around a particular electromagnetic signal frequency. In antennas, resonating elements emit radiation (during signal transmission operations) and receive radiation (in signal reception operations) in particular communications bands. In passive structures such as resonating element 162, no active signal transmission operations are performed (i.e., element 162 is not feed by a transmission line as with an antenna), but resonating element 162 may still exhibit a frequency response (peak signal absorption) that is centered about a particular frequency due to its geometry (e.g., its length relative to the wavelength of received electromagnetic signals) and its location relative to ground plane G. In the example of FIG. 3, structure 162 has been located adjacent to antenna 40L, but resonating elements such as resonating element 162 may be located elsewhere within the housing of device 10 if desired.

Figure 4:
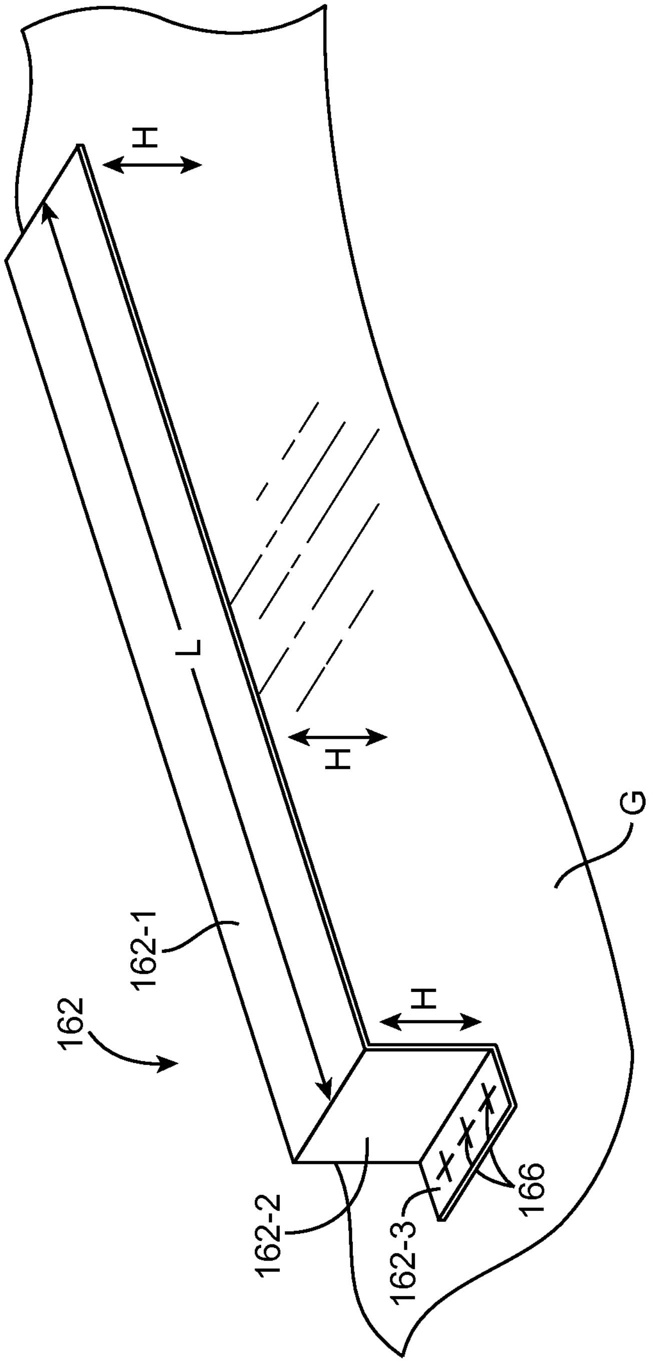
FIG. 4 is a perspective view of a resonating element structure in accordance with an embodiment of the present invention.

FIG. 4 is a perspective view of resonating element structure 162, showing how structure 162 may have a resonating element arm such as arm 162-1 that runs parallel to the surface of ground plane G at a height H. Branch 162-2 of structure 162 may run parallel to the surface normal for ground plane G (i.e., parallel to axis Z) and may electrically connect arm 162-1 to ground plane G. Portion 162-3 of structure 162 may be bent at a right angle to branch 162-2. Welds such as welds 166 or other fastening arrangements may be used to attach structure 162 to ground plane G. Structure 162 may be formed from a strip of metal or other suitable conductive element. The structures of ground plane G may include one or more electrically connected pieces of sheet metal (e.g., stainless steel). Structure 162 may be formed from stainless steel, copper, copper plated with gold, or other suitable conductors.

With the illustrative configuration for structure 162 that is shown in FIG. 4, structure 162 forms an L-shaped resonating element that resonates (absorbs electromagnetic energy) at a frequency that is related to its size (e.g., as in a quarter-wavelength L-shaped antenna resonating element). It has been determined that when structure 162 has a length L in the range of about 2 to 4 cm, interference that would otherwise adversely affect cellular telephone signal reception due to mixing products generated when simultaneously transmitting cellular telephone signals and operating display 14 can be significantly reduced. One possible mechanism for the interference reduction is the reduction in coupled electromagnetic energy into display 14 from antenna 40L during signal transmission operations that may result when some of the transmitted energy is dissipated instead in resonating element 162. Other interference reduction mechanisms may be involved as well.

The reduction in interference may be experienced in antenna structures that are adjacent to structure 162 (e.g., antenna 40L) and/or antenna structures at the other end of device 10 (e.g., antenna 40U). If desired, structure 162 may have shapes other than the illustrative shape of FIG. 4 (e.g., shapes in which arm 162-1 is bent to form a structure with multiple parallel and/or perpendicular sections with one, two, three bends or more, shapes with curved portions, shapes with multiple arms, etc.).

Figure 5:
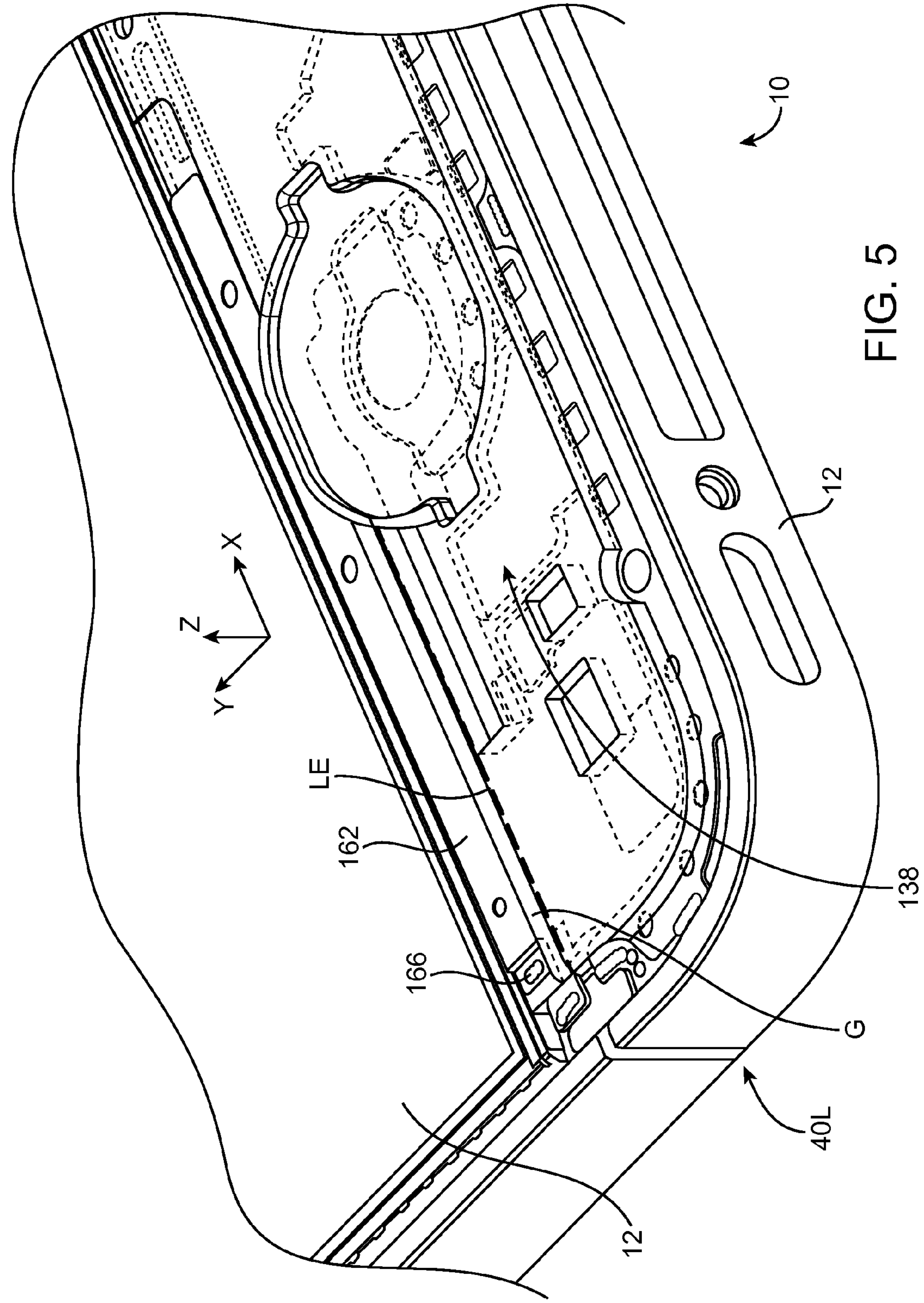
FIG. 5 is a perspective view of interior portions of an electronic device of the type shown in FIG. 1 showing where a resonating element structure of the type shown in FIG. 4 may be used in accordance with an embodiment of the present invention.

FIG. 5 is a perspective view of device 10 in the vicinity of antenna 40L and structure 162. Structure 162 may extend across the width of device 10, parallel to the lower edge LE of ground plane G. As shown in FIG. 5, the arm of structure 162 need not be rectangular and can include holes, cut-out regions (e.g., a curved section that accommodates the opening for button 16 of FIG. 1), etc. A plastic layer may be interposed between arm 162-1 and ground plane G (e.g., to support arm 162-1 at a desired value of height H). If desired, other dielectrics may be located between arm 162-1 and ground plane G. There may be any suitable number of structures 162 in device 10 (e.g., one at lower end 26, one at upper end 24, one at each end of device 10, etc.).

The foregoing is merely illustrative of the principles of this invention and various modifications can be made by those skilled in the art without departing from the scope and spirit of the invention.

What is claimed is:

1. An electronic device, comprising:
- a display having edges;
- an inverted-F antenna; and
- a ground plane that forms part of the inverted-F antenna;
- a resonating element structure that is separate from the inverted-F antenna, separate from the display, and is disposed in a location and has a selected length such that the resonating element structure substantially reduces signal interference associated with simultaneous operation of the display and the antenna, wherein the resonating element structure is not fed by any transmission lines, the resonating element structure comprises an L-shaped structure having an arm that has a longitudinal axis that extends parallel to at least one of the edges of the display and parallel to a front face of the electronic device, and a branch that extends perpendicular to the arm between the ground plane and an edge of the arm that is located at an end of the longitudinal axis of the arm, and wherein the arm has a greater length than the branch.

2. The electronic device defined in claim 1 further comprising a peripheral conductive housing member having at least a portion that forms part of the antenna.

3. The electronic device defined in claim 1 further comprising a peripheral conductive housing member having a portion that is separated from the ground plane by a dielectric-filled opening, wherein the portion of the peripheral conductive housing member forms part of the antenna.

4. The electronic device defined in claim 3 wherein the resonating element is interposed between the display and the dielectric-filled opening.

5. The electronic device defined in claim 1 wherein the branch is connected to the ground plane and extends perpendicular to the ground plane.

6. The electronic device defined in claim 5 wherein the branch is welded to the ground plane.

7. The electronic device defined in claim 1 wherein the arm overlaps the ground plane and the branch is connected to the ground plane, further comprising:
- plastic interposed between the arm and the ground plane.

8. The electronic device defined in claim 7 further comprising:
- a display driver circuit in the display; and
- a cellular telephone radio-frequency transceiver circuit coupled to the antenna that transmits radio-frequency signals using the antenna and that receives radio-frequency signals using the antenna, wherein the resonating element is configured to reduce interference in the received radio-frequency signals when the display driver circuit is operated while transmitting the radio-frequency signals.

9. An electronic device, comprising:
- a housing;
- a display mounted in the housing;
- a button mounted within the housing;
- at least one upper antenna at an upper end of the housing above the display;
- at least one lower antenna at a lower end of the housing below the display, wherein the at least one lower antenna comprises a loop antenna; and
- a resonating element structure configured to reduce interference between the display and the loop antenna, wherein the resonating element structure is not fed by any transmission lines, wherein the resonating element structure is interposed between the lower antenna and the display, the resonating element structure comprises an arm that extends parallel to an edge of the display and a branch that is connected to a ground plane, and the resonating element structure comprises a curved cut-out region that accommodates the button.

10. The electronic device defined in claim 9 further comprising:
- a rectangular ring-shaped conductive peripheral housing member that surrounds the housing, wherein the upper and lower antennas are formed from a ground plane and portions of the conductive peripheral housing member.

11. The electronic device defined in claim 10 wherein the electronic device comprises a handheld electronic device, the electronic device further comprising:
- a display driver circuit in the display; and
- a cellular telephone radio-frequency transceiver circuit coupled to the upper and lower antennas, wherein the resonating element structure is configured to reduce interference in radio-frequency signals received using at least one of the antennas when the display driver circuit is operated while simultaneously using the cellular telephone radio-frequency transceiver circuit to transmit radio-frequency antenna signals.

12. A method comprising:
- operating a display in an electronic device;
- simultaneous with operating the display, operating a loop antenna in the electronic device; and
- with a resonating element structure that is unfed by any transmission lines, reducing signal interference associated with simultaneous operation of the display and the loop antenna, wherein the resonating element structure has an arm that has a longitudinal axis that extends parallel to an edge of the display, wherein the arm has a length along the longitudinal axis and parallel to a face of the display through which the display displays light, a width perpendicular to the length and parallel to the face of the display that is less than the length, and a height perpendicular to the width and the length that is less than the width, and wherein the resonating element structure has a branch coupled between the arm and a ground plane for the resonating element structure that has a length that is less than the length of the arm.

13. The method defined in claim 12 wherein:

operating the antenna comprises, simultaneous with operating the display, transmitting and receiving radio-frequency signals using the antenna and a cellular telephone radio-frequency transceiver circuit coupled to the antenna;

operating the display comprises, simultaneous with transmitting and receiving radio-frequency signals using the antenna, generating drive signals for the display using a display driver circuit; and reducing signal interference comprises reducing interference in the received radio-frequency signals when the display driver circuit is operated while transmitting the radio-frequency signals.

14. The electronic device defined in claim 9, wherein the resonating element structure has a length between two and four centimeters.

15. The electronic device defined in claim 12, wherein the resonating element structure comprises a curved cut-out section that accommodates a button for the electronic device.

16. The electronic device defined in claim 9, wherein the arm has a longitudinal axis that extends parallel to the edge of the display, the arm has a length along the longitudinal axis and parallel to a face of the display through which the display displays light, and a width perpendicular to the length and parallel to the face of the display that is less than the length.

17. The electronic device defined in claim 16, wherein the arm has a height perpendicular to the width and the length that is less than the width.

18. The electronic device defined in claim 16, wherein the branch has a length that is less than the length of the arm and the branch is connected to the arm at an end of the longitudinal axis.

19. The method defined in claim 12, wherein the face of the display has a length and a width that is less than the length and the length of the resonating element structure extends across the width of the display.

20. The electronic device defined in claim 1, wherein the length of the arm extends along the longitudinal axis, the arm has a width perpendicular to the length of the arm that is less than the length of the arm, the arm has a height perpendicular to the length and the width of the arm that is less than the width of the arm, and wherein the display has a face through which the display displays light, the face has a length and a width, and the length of the arm extends across the width of the face of the display.

* * * * *